June 13, 1950

H. BIENFAIT ET AL 2,511,426

TOUCH WELDING APPARATUS

Filed July 29, 1948

MARINUS JACOBUS JANSEN
JOHANNES ANDRIES ARNOLDUS GILSING
HENRI BIENFAIT
WILLEM PIETER VAN DEN BLINK
INVENTORS

BY Fred M Vogel

AGENT

Patented June 13, 1950

2,511,426

UNITED STATES PATENT OFFICE 2,511,426

TOUCH WELDING APPARATUS

Henri Bienfait, Willem Pieter van den Blink, Johannes Andries Arnoldus Gilsing, and Marinus Jacobus Jansen, Eindhoven, Netherlands, assignors to Hartford National Bank and Trust Company, Hartford, Conn., as trustee Application July 29, 1948, Serial No. 41,366
In the Netherlands September 25, 1947

10 Claims. (Cl. 219—8)

The invention relates to a method of touch welding by the use of two or more welding rods which become operative in succession. It is known that in this welding method the welding rods are at a certain, favourable angle with the work piece and the welding ribbon is formed due to the fact that the rod, which, while dropping, generally under the action of its own weight, is consumed. In certain cases, in which the welding rod cannot be kept in touch with the work continuously, use may be made of a counterweight or similar means.

The invention has for its object to improve this method in such manner that the welding operation is not adversely affected by the presence of the remainder of the preceding welding rod or by the presence of the electrode holder.

According to the invention, this is achieved in that the means by which a preceding rod is held or carried away from the work on the subsequent welding rod becoming operative are operated by the ignition of the arc of the subsequent welding rod. If the preceding welding rod need only be held, the means may be such that the position of the rod remains stabilized, for example, irrespective of the variations that occur in the arc of the subsequent rod. Even separate means may be used for this purpose, particularly where the preceding rod is carried away from the work.

The method according to the invention has the advantage over prior knowledge that with a touch-welding rod which has accomplished its function, the means make sure that this rod can no longer strike an arc or establish shortcircuiting with the work, so that the weld or the welding process are not harmfully affected as soon as the subsequent welding rod has resumed the function of the preceding one. For this purpose, it is essentially by no means necessary for the welding rod used, to be completely consumed. The control of the said means is effected by employing the criterion hitherto not applied but being the only one which obtains that the passage of current through the preceding rod should be hampered or prevented directly upon or a short period after the subsequent rod has struck its arc.

In a device for carrying out the method according to the invention, the said means are constituted, for example, by an electromagnetic device, the coil of which is included in a circuit in which a current or voltage is produced by the ignition of the arc of the subsequent welding rod.

In the most simple case the coil of the electromagnetic device is energised by the welding current which is produced by ignition of the arc of the subsequent welding rod.

However, as an alternative, it is possible to include the coil in an auxiliary circuit which is energized by the current passing through the welding-current circuit. As a further alternative, it is possible to supply the coil from the welding current via a transformer.

The electromagnetic device may comprise, for example, a coil acting upon a magnetisable core.

For striking the arc of the subsequent welding rod, several methods may be used. It is, for example, possible to use semi-automatic or automatic devices. In a semi-automatic device the current of the subsequent rod, which already bears on the work, is made, for example, by a press-button, which may be operated when the preceding rod has traversed a desired distance. In a further form, the welding circuit of the subsequent rod may be closed by this welding rod, which before does not bear on the work. In an automatic device control may be effected by the preceding welding rod.

As a further alternative, if, for example a continuously welding ribbon is required to be made, the subsequent welding rod, already switched on may bear on the work, use being made, for example, of so-called self-starting welding rods insulated from the work, for example by a small paper disc, or else of welding rods which are not self-starting when cold. In these cases it is common practice to arrange for the subsequent welding rod to be ignited directly by the arc of the preceding welding rod.

In order that the invention may be more clearly understood and readily carried into effect it will now be described more fully with reference to the accompanying drawing.

Figure 1:
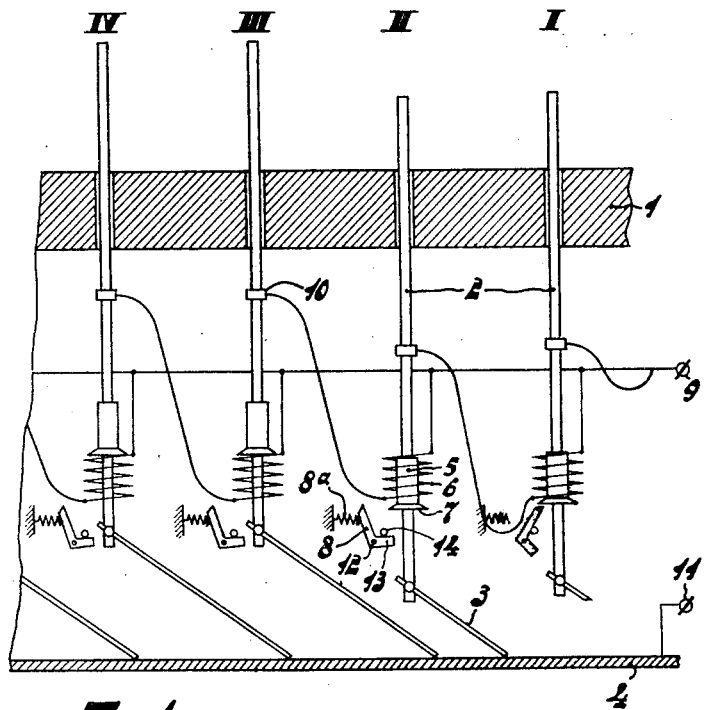
Fig. 1 shows diagrammatically the form of a lifting device and a stabilising device, stabilising being effected by mechanical means.

Referring to Fig. 1, 1 designates a guide for an electrode holder 2 for any number of welding units I, II, III, IV, and so forth, which allows the electrode 3 to move in a vertical and an axial direction. The welding rod 3 moves in a slot, in which the welding ribbon provided in the work 4 is required to be formed. The electrode holders 2 each comprise a core 5, which is adapted to be influenced by a coil 6. The core is provided with a projecting lug 7, which is adapted to be engaged by a catch 8, as indicated for the unit I, The coil 6 is connected at one end to the terminal 9 of a supply source and at the other end to the wire terminal 10 of the subsequent electrode holder. The work 4 is connected to the other terminal 11 of the supply source 9, 11. The catch 8 is pivoted to a fixed point 12 and comprises an arm 13. A projecting lug 14 serves as a stop for one of the extreme positions of the catch 8. The operation is as follows: The electrode of I is elevated on current passing through the coil 6 of I and welding being performed by II is included in a closed circuit comprising terminal 9—the coil of I—the electrode holder 2 of II—the welding rod 3 of II—the work 4—terminal 11. The electrodes of III, IV and so forth engage the work but they are not yet in use, since ignition is not yet possible on the basis of definite provisions described more fully in the opening part of the description. On the welding rod 3 of II being further consumed, the projecting lug 7 of II will engage the arm 13 of II. The position and length of the arm 13 are such that the projecting lug 7 will cause the catch 8, which is rigidly secured to the arm 13, to tumble about the pivot 12 until the catch 8 engages the projecting lug 14, whereas on ascending, the projecting lug 7 will move clear of the tilted arm 13. The instant the welding rod of II is consumed to such an extent that the arc of the welding rod of III is struck, the coil 6 of II is energized; it is included in the welding-current circuit of III. On the coil of II being energized, the core 5 of II will be attracted upwards, the projecting lug 7 thus reversing the catch 8 and passing by it; on collision with a spring 8a the catch is then thrust back against the projecting lug 14 (I, in Fig. 1). The projecting lug 7 on the core 5 will thus be positioned above the associated catch 8 but will not bear on it, as it is shown for the welding unit I. On the welding circuit of II being broken, the energizing of the coil 6 of I will cease and the electrode holder 2 of I will drop until the projecting lug 7 of I bears on the catch.

Figure 2:
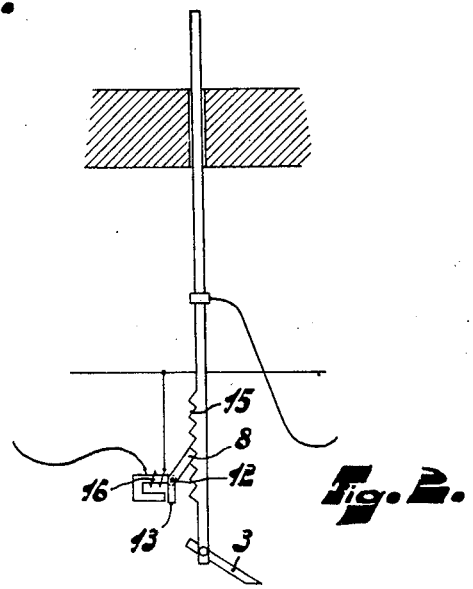
Fig. 2 is a diagrammatic view of a holding device.

Fig. 2 shows a unit comprising a holding device operating with the use of a catch 8, which tumbles into a toothed rim 15 as soon as the coil 16 attracts the soft-iron part 13 of the catch. The coil 16 is included in the welding-current circuit of the subsequent rod, so that the catch 8 tilts upon this subsequent welding rod being ignited. On the welding rod 3 being further consumed, the next following tooth of the toothed rim 15 will be caused to engage the catch 8 with the result that the welding rod, on being further consumed, is prevented from lowering and the arc finally becomes large enough to extinguish. This prevents the welding operation from being impaired in any way by the presence of the remainder of the welding rod 3 or of the electrode holder.

What we claim is:

1. An apparatus for touch welding comprising a first welding rod holder and a second welding rod holder both mounted in operative relationship with a metallic work-piece to be welded, an electrical-energy source, means connecting said electrical-energy source to each of said welding rod holders, other means connecting said electrical-energy source to said work-piece and electro-magnetic means included in said first means and responsive to the flow of welding current through said second welding rod holder for moving said first welding rod holder out of operative relationship with said work-piece.

2. An apparatus for touch welding comprising a first welding rod holder and a second welding rod holder both mounted in operative relationship with a metallic work-piece to be welded, an electrical-energy source, means connecting said electrical-energy source to said first welding rod holder, other means connecting said electrical-energy source to said second welding rod holder, said other means including the coil of an electromagnetic device, further means connecting said electrical-energy source to said work-piece, and means responsive to the flow of welding current through said electromagnetic device for moving said first welding rod holder out of operative relationship with said workpiece.

3. An appararatus for touch welding comprising a first welding rod holder and a second welding rod holder both mounted in operative relationship with a metallic work-piece to be welded, an electrical-energy source, means connecting said electrical-energy source to each of said welding rod holders, other means connecting said electrical-energy source to said work-piece, means responsive to the flow of welding current through said second welding rod holder for moving said first welding rod holder out of operative relationship with said work-piece, and holding means for stabilizing the position of said first welding rod holder subsequent to operation of said holder moving means.

4. An apparatus for touch welding comprising a first welding rod holder and a second welding rod holder both mounted in operative relationship with a metallic work-piece to be welded, an electrical-energy source, means connecting said electrical-energy source to each of said welding rod holders, other means connecting said electrical-energy source to said work-piece, means responsive to the flow of welding current through said second welding rod holder for moving said first welding rod holder out of operative relationship with said work-piece, and holding means for stabilizing the position of said first welding rod holder subsequent to operation of said holder moving means, said holding means including a click mechanism mounted adjacent said first welding rod holder and a projection mounted on said first welding rod holder in operative association with said click mechanism.

5. In combination, a device for touch welding comprising a first welding rod holder and a second welding rod holder, an electrical-energy source having a pair of mains, means connecting one of the mains of said electrical-energy source to said first welding rod holder, other means connecting said one of the mains to said second welding rod holder, an electromagnetic core mounted on said first welding rod holder, said other means comprising an electromagnetic coil operatively associated with said core for retracting said first holder, a work piece, means connecting the other of said pair of mains to said work piece, a welding rod mounted on each of said welding rod holders and projecting therefrom towards said work piece, means for guiding said welding rod holders in substantially an axial direction towards and away from said work piece so that said rod may abut said work piece, and means adjacent said first welding rod holder for holding said holder in a position wherein said welding rod projecting from said holder does not abut said work piece, after said holder has been retracted from said work-piece.

6. In combination, a device for touch welding comprising a first welding rod holder and a second welding rod holder, an electrical-energy source having a pair of mains, means connecting one of the mains of said electrical-energy source to said first welding rod holder, other means connecting said one of the mains to said second welding rod holder, an electromagnetic core having a projection connected thereto, abutment means on said first rod holder, said projection being located for permitting movement thereof to a position abutting said abutment means, said other means comprising an electromagnetic coil operatively associated with said core for retracting said first holder, a work piece, means connecting the other of said pair of mains to said work piece, a welding rod mounted on each of said welding rod holders and projecting therefrom towards said work piece, and means for guiding said welding rod holders in substantially an axial direction towards and away from said work piece so that said rods may abut said work piece.

7. A device for touch welding comprising a first welding rod holder and a second welding rod holder, a first electrical conductor connected at one end thereof to said first welding rod holder and adapted to be connected at the other end thereof to an electrical-energy source, a second electrical conductor connected at one end thereof to said second welding rod holder and adapted to be connected at the other end thereof to an electrical-energy source, a coil in serial relationship with said second conductor, core means operatively associated with said coil for electromagnetic actuation thereby, said core means being operatively associated with said first welding rod for causing movement of said first welding rod holder upon movement of said core means when said coil is energized.

8. A device for touch welding as claimed in claim 7 wherein said core means is mounted on said first rod holder.

9. A device for touch welding as claimed in claim 7, wherein said core means is mounted adjacent said first rod holder and has a part thereof which is positioned for abutting and moving said first welding rod holder when said core means is moved.

10. A device for touch welding as claimed in claim 7, wherein additional means are provided adjacent said first welding rod holder for preventing the same from assuming the position thereof held prior to movement thereof by said core means.

HENRI BIENFAIT.
WILLEM PIETER van den BLINK.
JOHANNES ANDRIES ARNOLDUS GILSING.
MARINUS JACOBUS JANSEN.

REFERENCES CITED

The following references are of record in the file of this patent:

UNITED STATES PATENTS

| Number | Name | Date |
|---|---|---|
| 458,719 | Ward | Sept. 1, 1891 |
| 1,807,961 | Burnish | June 2, 1931 |
| 2,453,930 | Van Der Berge et al. | Nov. 16, 1948 |

FOREIGN PATENTS

| Number | Country | Date |
|---|---|---|
| 35,608 | Great Britain | Oct. 15, 1931 |
| 72,671 | Norway | Oct. 13, 1947 |